United States Patent [19]

Leiber

[11] 4,286,626
[45] Sep. 1, 1981

[54] MAGNETIC VALVE

[75] Inventor: Heinz Leiber, Leimen, Fed. Rep. of Germany

[73] Assignee: Robert Bosch GmbH, Stuttgart, Fed. Rep. of Germany

[21] Appl. No.: 39,033

[22] Filed: May 14, 1979

[30] Foreign Application Priority Data

May 20, 1978 [DE] Fed. Rep. of Germany ....... 2822142

[51] Int. Cl.³ .............................................. F16K 31/06
[52] U.S. Cl. ............................... 137/625.65; 251/129; 251/330; 251/335 A
[58] Field of Search .................... 137/625.65; 251/129, 251/335 A, 330

[56] References Cited

U.S. PATENT DOCUMENTS 3,329,165  7/1967  Lang ................................. 137/625.5
4,040,445  8/1977  McCormick ................ 137/625.65 X

FOREIGN PATENT DOCUMENTS 1930447  1/1970  Fed. Rep. of Germany ...... 137/625.65
1302616  7/1962  France ............................... 137/625.65

Primary Examiner—Gerald A. Michalsky
Attorney, Agent, or Firm—Edwin E. Greigg

[57] ABSTRACT

The invention relates to a magnetic valve in which the electromagnet is housed in a chamber which is not infiltrated by the pressure medium to be controlled, and in which a rod coupling is effective between the armature of the electromagnet and the closure body of the valve inserted between a pressure source and a pressure consumer, and in which a sealing apparatus is provided which seals the entryway of the rod coupling into the region infiltrated by pressure medium.

8 Claims, 7 Drawing Figures

MAGNETIC VALVE

BACKGROUND OF THE INVENTION

The invention relates to a magnetic valve in which the electromagnet is housed in a chamber which is not infiltrated by the pressure medium to be controlled, and in which a rod coupling is effective between the armature of the electromagnet and the closure body of the valve inserted between a pressure source and a pressure consumer, and in which a sealing apparatus is provided which seals the entryway of the rod coupling into the region infiltrated by pressure medium.

A magnetic valve of this type having a "dry magnetic circuit" and actuation of the valve body by means of a rod disposed between the armature and the closure body is known from the German Pat. No. 807,348. In this disclosure, there is no mention of how to effect the passage of the rod coupling in a sealed manner through the housing surrounding the region infiltrated by pressure medium. Since this sealing problem is difficult to solve, particularly when high pressures are involved, valves of this type have found very little acceptance.

OBJECT AND SUMMARY OF THE INVENTION

Thus, the principal object of the invention is to create a solution to this sealing problem, while at the same time keeping the cost to a minimum. Additionally, it is intended that the forces required for adjustment be kept small and that they remain constant during operation over a period of years.

This object is attained in that the rod coupling is passed through a wall between a high-pressure chamber which can be connected with the source of relatively high pressure and an intermediate-pressure chamber located between the high-pressure chamber and the electromagnet and communicating with a low-pressure chamber subjected to relatively low pressure. This passage is effected through an opening which is so dimensioned that, first, on the one hand a flow of pressure medium is created along the rod coupling between the high-pressure chamber and the low-pressure chamber while on the other hand the pressure drop at the passageway opening between the high-pressure chamber and the intermediate-pressure chamber constitutes by far the greatest share of the pressure difference between the high-pressure chamber and the low-pressure chamber; that, secondly, the entry of the rod coupling from the electromagnet side into the intermediate-pressure chamber is sealed off by means of a membrane secured to the rod coupling and to the valve housing; and that, finally, in one position of the valve, a closure part to be actuated by the rod coupling interrupts a flow of pressure medium from the source of relatively high pressure to the intermediate-pressure chamber.

The use of a dry magnetic circuit carries with it the advantage that the design engineer has more freedom as to form, method of manufacture and materials as well as the fact that the magnetic circuit does not have to be tightly welded or soldered. Also, with a dry magnetic circuit, the valve movements can be more easily detected by means of associating measurement pickups with the moving parts, which may be of value in testing the functioning of the valve. In addition, the response time of the valve may be electronically evaluated, for example, by applying voltage until the armature moves, and then utilized for regulatory processes. Because of this separate structure, the chamber which includes the region infiltrated by the pressure medium can be very much smaller. However, smaller pressure chambers also connote smaller pressure forces to be absorbed by the valve housing.

Applying the invention in use first presupposes a source of relatively high pressure, whereby the valve is intended to control the flow of pressure medium to a consumer; however, it also presupposes a low-pressure chamber. Such conditions may be found in anti-locking control systems for motor vehicles, for example, where on the one hand there is a source of brake pressure, and on the other hand it is also necessary to release brake fluid, by means of valves, out of the wheel brake cylinders into a reservoir of relatively low pressure. If the source of brake pressure is a pump which has a subsequent brake control valve (full-power), then the low-pressure chamber is the brake fluid reservoir having a zero pressure. Also, if a main brake cylinder is used as the pressure source, the released pressure medium is released into a storage chamber, which is under low pressure and whose contents must be fed back into the main pressure circuit. Other systems with similar conditions are also conceivable.

The invention can also be used when gas is used as the pressure medium; however, it is primarily intended for use in hydraulic systems. Thus, it is possible to employ the closure part used to interrupt the flow of pressure medium to the intermediate-pressure chamber as a closing body for the actual valve disposed between the pressure source and the consumer as well. Such a valve may be embodied as a 2/2-way valve, that is, respectively connecting and separating two connection points with each other in its two positions. However, it may also be embodied as a 3/2-way valve; in this case, a third valve connection point is provided, and the closing body, in its two positions, first connects the pressure source with the consumer and then connects the consumer, via the third connection point, with the low-pressure chamber.

In so doing, two possibilities are conceivable. In the first, the passageway opening for the rod from the intermediate-pressure chamber discharges in the region of this attachment downstream of the appropriate valve seat. Here, the closing body, in its first position in which it closes the connection from the consumer to the low-pressure chamber, also takes over the interruption of the flow of pressure medium to the intermediate-pressure chamber. In the other possibility, the passageway opening, then appropriately dimensioned, is utilized as a third connection point, through which the consumer can be connected with the low-pressure chamber by way of the intermediate-pressure chamber. In this event, as well, the closing body has a double function in one of its positions.

The actual valve closing body can also be embodied as a spool valve; but in that event, a separate closure part must also be provided for the purpose of interrupting the leakage flow to the intermediate-pressure chamber.

At the point where the closure part, when the magnetic valve is in its position of rest, prevents the flow through to the intermediate-pressure chamber, a spring force acting upon the closure body is preferably provided.

The above-mentioned membrane is preferably embodied as a metal membrane, and it is connected with the rod and the housing in a conventional manner.

There can be a signal transducer, in the form of a contact or an electronic transducer (Hall-effect detector, semiconductor responsive to a magnetic field, etc.), associated with the moving valve parts located outside the pressure chambers, in order to be able to test the functional capacity of the valve. This signal can additionally be used to determine the response time of the valve and applied to regulatory techniques.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
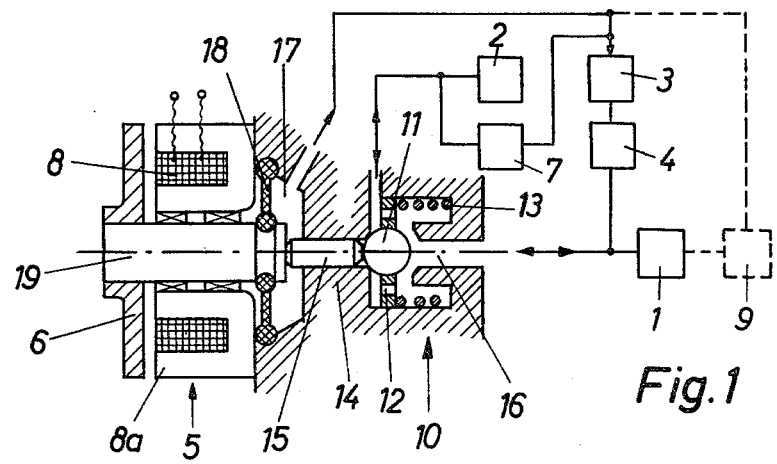
FIG. 1 shows one exemplary embodiment of the invention with a 2/2-way valve.

Turning now to the drawings, in FIG. 1 there is a pressure source 1, which may be, for example, a main brake cylinder; a consumer 2, which may be, for example, a wheel brake cylinder; and a low-pressure chamber 3, for example, a storage chamber. The magnetic valve 5/10 of the invention is switched into the line between the main brake cylinder 1 and the wheel brake cylinder 2. Thus, here, the magnetic valve 5/10 is used as an inlet valve, and in its excited state it blocks the line from the main brake cylinder 1 to the wheel brake cylinder 2. Then, by means of the outlet valve 7, brake fluid can be released from the line section between valve 10 and wheel brake cylinder 2 into the storage chamber 3. The released pressure medium is fed back into the main circuit by the feedback apparatus 4, which may be, for example a pump.

The magnetic valve including the assembly denoted 5/10 comprises the valve part 10 which includes the closure part 11 embodied as a ball member, together with the holder 12 for the ball and the spring 13, which holds the closure part 11 in the position shown. And, the electromagnet 5 is made up of the armature 6, the core parts 8a, the winding 8 and the rod 19. The electromagnet 5 is disposed outside the pressure chambers of the valve. The valve 10 is actuated by means of the armature 6 which actuates the rod 19 and this in turn contacts an auxiliary rod 15 which extends through the wall 14. The passageway opening for the auxiliary rod 15 is so dimensioned that a leakage flow is possible along the rod 15 from the high-pressure chamber 16 (the chamber of relatively high pressure) to the intermediate-pressure chamber 17. The intermediate-pressure chamber 17 is sealed off from the outside by means of a membrane 18 which in turn is secured to the rod 19 and to the valve housing.

During braking, a high pressure is present in the pressure chamber 16 as well as at the brakes, however, since the ball closure body 11 seals off the opening for the passageway of the auxiliary rod 15 through the aperture in the wall 14, this high pressure does not result in any leakage flow along the rod. Only when there is brake pressure regulation, and the valve 10 has thus (relatively briefly) switched over, does a leakage flow arise, as a result of the higher pressure in the high-pressure chamber 16, along the auxiliary rod 15 into the intermediate-pressure chamber 17 and from there to the storage chamber 3 serving as the low-pressure chamber. The pressure difference between the intermediate-pressure chamber and the low-pressure chamber is small. As a result of this embodiment in accordance with the invention, the sealing problem for the passageway of the rod 19/15 is entirely noncritical: first, there are no problems created by a need for sealing the passageway of the auxiliary rod 15, since the leakage flow is permissible and second, the embodiment of the membrane 18 is entirely unproblematic, because the membrane is exposed to only small pressure differences.

In FIG. 1 it is additionally indicated by means of broken lines that when the brake pressure source 1 is embodied as a pump having a subsequent brake pressure control valve the brake fluid flowing from the valve 7 and out of the chamber 17 can flow into a reserve container 9. Then the low-pressure chamber has an overpressure of zero. In this embodiment, the storage chamber 3 and the feedback apparatus 4 are omitted.

Figure 2:
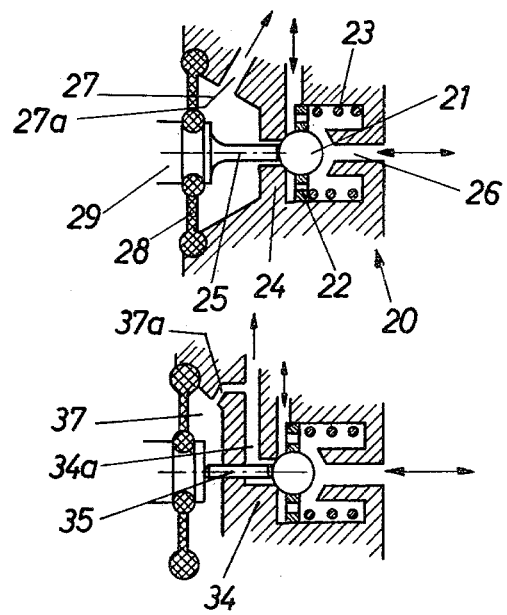
FIG. 2 shows another exemplary embodiment of the invention with a 3/2-way valve.

In the exemplary embodiment of FIG. 2, only the valve part 20 is shown, which is now embodied as a 3/2-way valve. Parts 21-29 of FIG. 2 correspond to the parts 11-19 of FIG. 1. The only difference here is that the passageway opening for the auxiliary rod 25 is dimensioned somewhat larger; in other words, a greater leakage flow is knowingly permitted. The flowthrough openings for this leakage flow, first along the auxiliary rod 25 and second from the intermediate-pressure chamber to the low-pressure chamber are selected to be such that virtually the entire pressure difference (e.g., 99%) between the chamber 26 and the low-pressure chamber drops at the opening along the auxiliary rod 25. Here, as well, the membrane 28 is not exposed to any high pressure and there are no sealing problems at the passageway opening. The path through the passageway opening and then from the intermediate-pressure chamber to the low-pressure chamber in this case replaces the outlet valve 7 of FIG. 1, over which pressure medium is released when the valve is switched.

Figure 3:
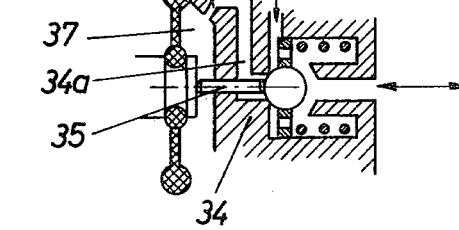
FIG. 3 is a further exemplary embodiment of the invention with a 3/2-way valve.

In FIG. 3, as in FIG. 2, a 3/2-way valve is shown, in this case being provided with a separate outlet channel. The prescribed dimensions of FIG. 1 apply to the auxiliary rod 35 which is passed through the aperture in the wall 34 and to the opening for the rod 35; that is, only a small leakage flow is permitted along the rod 35. The auxiliary rod 35, in this embodiment, ends in a connection to the low-pressure chamber 3 by means of a channel 34a provided in the wall 34 and by means of which the pressure can be lowered when the valve is excited. The discharge of the outlet 37a into this connection is such that the flow resistance from the connection 34a into the chamber 37 is clearly greater than that toward the low-pressure chamber 3. Thus, as in the other exemplary embodiments, there are no sealing problems in this embodiment as well.

Figure 4:
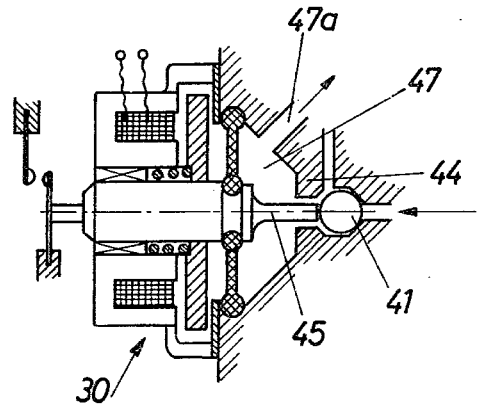
FIG. 4 is a further exemplary embodiment of the invention with a 3/2-way valve.

In the exemplary embodiment of FIG. 4, in the rest position shown for the electromagnet 30, the connection between the pressure source and the consumer is closed, and the pressure at the consumer is reduced by way of the opening for the passageway of the auxiliary rod 45 through the aperture in the wall 44 and the connection of the intermediate-pressure chamber 47 with the low-pressure chamber 47a. The proportions of the exemplary embodiment of FIG. 2 apply to the dimensions of the openings here as well. After the pressure drops at the consumer, no further leakage flow takes place here either. This is also true after the valve has switched over, because then the ball valve 41 seals off the release opening along the auxiliary rod 45.

Figure 5:
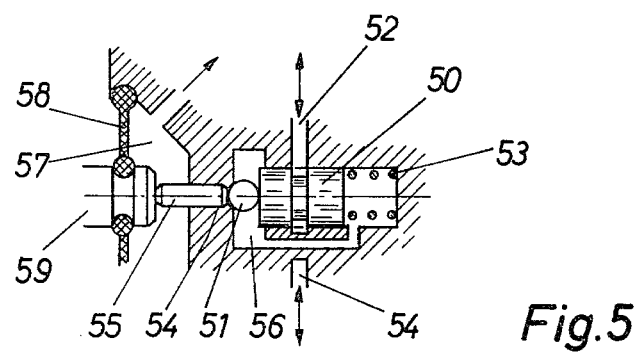
FIG. 5 is an exemplary embodiment of the invention having a spool valve.

In FIG. 5, a 2/2-way spool valve is shown, the piston surface 50 of which is displaced via the rod 59 together with the auxiliary rod 55 and via the spring 53. Thus, in one position, the spool valve connects the inlet 24 with the outlet 52, and in the other position it blocks this connection. The piston here is not supported in a sealed manner so that approximately the same pressure is present in the chamber 56 as at the entrance 54. The passageway of the auxiliary rod 55 through the aperture in the wall is embodied in a manner corresponding to FIGS. 1 and 3; that is, a small leakage flow is permitted when the valve is excited and the ball valve closure body 51 has been lifted. Thus in this embodiment as well, no leakage flow takes place in the "at rest" position of the valve, while there is a small leakage flow in the switched state of the valve; but this small flow does not permit any substantial pressure drop in the chamber 57 and thus does not stress the membrane 58.

Figure 6:
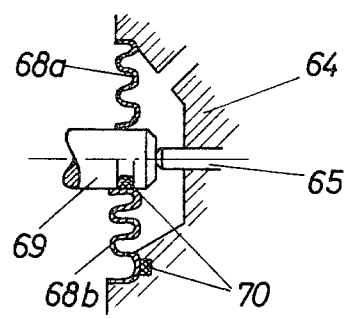
FIG. 6 shows an embodiment of the invention utilizing a flexible diaphragm.

In the views a and b of FIG. 6, two exemplary embodiments of the membrane are shown. In a there is a metallic membrane 68a pressed in between the rod 69 and the housing; and in b there is a metallic membrane 68b which includes additional sealing members 70.

Figure 7:
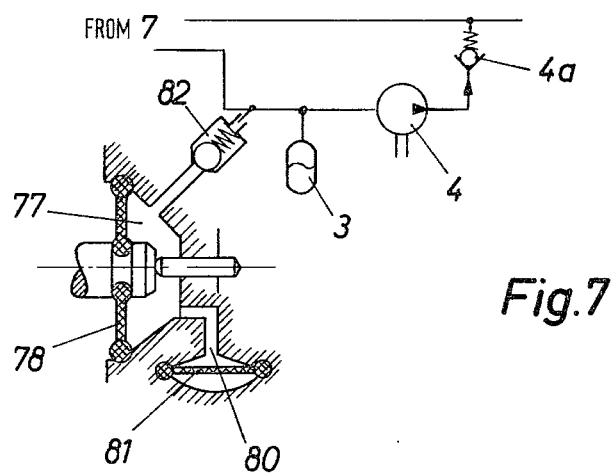
FIG. 7 shows an exemplary embodiment of the invention having an intermediate storage chamber.

In FIG. 7, as in FIG. 1, a feedback circuit is provided for the released fluid and the leakage flow. This circuit comprises the storage chamber 3 and the pump 4, which feeds the fluid back via the check valve 4a into the main circuit. If the pressure in the storage chamber 3 is too high for the membrane 78, then an auxiliary storage chamber 80 having a soft membrane 81 can be provided, which for a period of time absorbs the leakage flow. If the storage chamber 3 is evacuated, then the fluid quantity stored in the auxiliary storage chamber is forced via the check valve 82 into the storage chamber 3. If so desired, the membrane 78 may also be resilient, so that the chamber 77 per se serves as the auxiliary storage chamber.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A magnetic valve including a housing and an electromagnet having an armature housed in a chamber in said housing which is not infiltrated by a pressure medium to be controlled, a high-pressure chamber arranged to be connected with a source of relatively high pressure and an intermediate-pressure chamber located between said high-pressure chamber and said electromagnet, a wall having a passageway opening between said high-pressure chamber and said intermediate-pressure chamber, a low-pressure chamber subjected to relatively low pressure, said intermediate-pressure chamber communicating with said low-pressure chamber, a rod coupling connected to said armature of the electromagnet, a separate auxiliary rod positioned in said passageway opening in said wall between said rod coupling and said high-pressure chamber, a sealing apparatus for sealing the passageway opening in said wall containing said auxiliary rod from said high-pressure chamber, said passageway opening and said auxiliary rod being so dimensioned that only a small flow of pressure medium flows from said high-pressure chamber to said intermediate pressure chamber along the auxiliary rod whereby the pressure drop at said passageway opening between said high-pressure chamber and said intermediate-pressure chamber constitutes the greatest share of the pressure difference between high-pressure chamber and said low-pressure chamber, a membrane secured to said rod coupling and to said valve housing for sealing off the entry of said rod coupling from the electromagnet side into said intermediate-pressure chamber, said sealing apparatus including a closure part arranged to be actuated by said auxiliary rod whereby, in one position of said magnetic valve, said closure part is actuated by said auxiliary rod and permits a flow of pressure medium from the source of relatively high pressure to said intermediate pressure chamber.

2. A magnetic valve in accordance with claim 1, characterized in that said closure part which interrupts the flow of pressure medium from the source of relatively high pressure to said intermediate-pressure chamber in one valve position simultaneously serves as a closure body of the valve located between the source and a consumer.

3. A magnetic valve in accordance with claim 2, characterized in that said closure body, in the normal position of the valve, closes said passageway opening between said high-pressure chamber and said intermediate-pressure chamber and, in the other position of the valve, closes the connection between the source and the consumer.

4. A magnetic valve in accordance with claim 2, characterized in that the valve is provided with a further connection point communicating with said low-pressure chamber, whereby said closure body alternatively opens the connection between the pressure source and the consumer or the connection between the consumer and said low-pressure chamber and that said passageway opening from said intermediate-pressure chamber to said high-pressure chamber discharges in the region of said further connection point downstream of the associated valve seat.

5. A magnetic valve in accordance with claim 2, characterized in that said appropriately dimensioned passageway opening between said high-pressure chamber and said intermediate-pressure chamber serves as a further connection point for a connection between the consumer and said low-pressure chamber, whereby said closure body alternatively opens the connections between the pressure source and consumer or between the consumer and said low-pressure chamber.

6. A magnetic valve in accordance with claim 1, characterized in that said valve comprises a spool valve moved by said rod, which spool valve is actuated together with said closure part for said passageway opening.

7. A magnetic valve in accordance with claim 1, including a closure part holder associated with said closure part, a spring for pressing against said closure part holder thereby pressing said closure part onto a valve seat associated with said passageway opening for said auxillary rod when said electromagnet is deactivated.

8. A magnetic valve in accordance with claim 1, characterized in that said membrane comprises a metallic membrane, said membrane being connected in the conventional manner with said rod and said housing.

* * * * *